T. B. WELLER.
STOCK WATERING TANK.
APPLICATION FILED OCT. 2, 1911.
1,073,195.
Patented Sept. 16, 1913.
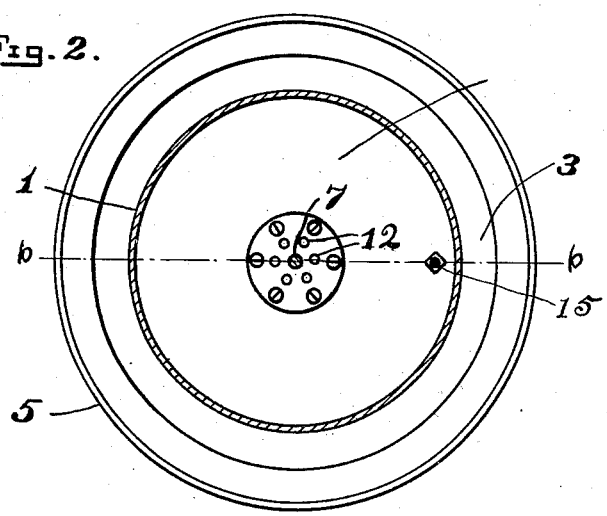
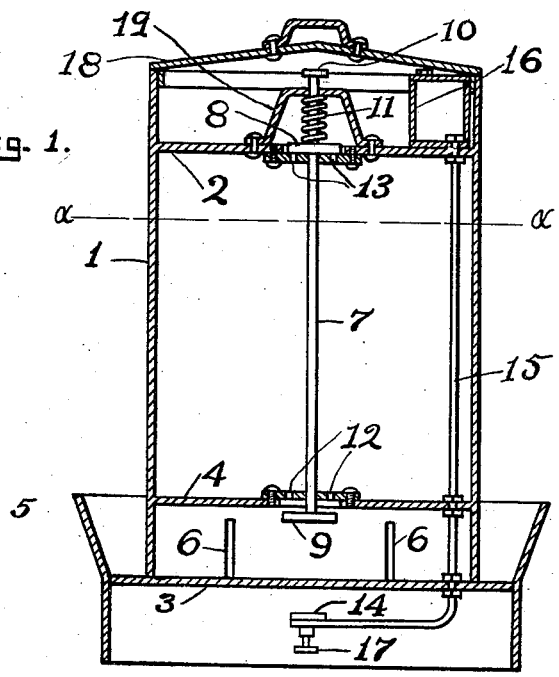
WITNESSES:
Bert Kree
Ethel Kern
INVENTOR.
Thomas B. Weller
BY William J. Davis
ATTORNEY.

UNITED STATES PATENT OFFICE.

THOMAS BURNACE WELLER, OF VINITA, OKLAHOMA.

STOCK-WATERING TANK.

1,073,195.  Specification of Letters Patent.  Patented Sept. 16, 1913.

Application filed October 2, 1911. Serial No. 652,399.

*To all whom it may concern:*

Be it known that I, THOMAS B. WELLER, a citizen of the United States, residing at Vinita, in the county of Craig and State of Oklahoma, have invented certain new and useful Improvements in Stock-Watering Tanks, of which the following is a full, clear, and exact description, such as will enable others skilled in the art to which it appertains to make and use the same.

The invention relates to watering tanks for live stock, and seeks to provide a simple and effective form of tank, wherein a supply of water may easily be stored and automatically fed to a trough, from which the stock may drink.

It is essential that watering tanks not only automatically fill the drinking trough, but some means must be provided whereby the tank may be easily and readily filled, also means for heating the water to prevent freezing is very desirable.

The present invention seeks to provide a simple and efficient automatic watering tank with a reservoir above the storage chamber, wherein the water may be placed and fed into the storage chamber, through a conveniently located and easily operated valve, automatically closing communication from the storage chamber to the watering trough when communication from the reservoir to the storage chamber is established.

A further object of the invention is to provide a burner and fuel supply tank, with a connecting pipe protected from dislocation by the stock, by passing it through the storage chamber from the burner to the fuel tank, for the purpose of heating the water to prevent freezing.

With these and other objects in view, the invention consists in the features of construction, combinations and arrangements of parts as hereinafter set forth, illustrated in the accompanying drawings and more particularly pointed out in the claims appended.

In the drawings: Figure 1 is a vertical cross section on line *b—b* of Fig. 2, illustrating a stock watering tank, to which the improvements are applied. Fig. 2 is a horizontal section in plan view on line *a—a* of Fig. 1.

To the shell 1 is secured heads 2 and 3 and intermediate head 4, the head 3 extending laterally beyond the shell 1 and terminating in annular flange 5. The flange 5 extends upward above the top of holes 6, and downward below the head 3. Within the shell 1, above the head 2 is formed a reservoir, in which the water is placed to be fed into the storage chamber, which is formed within the shell 1 between the heads 2 and 4. The shell 1 is mounted with a cover 18 to prevent the stock from interfering with the parts that project above head 2.

A valve is formed of stem portion 7 and head portions 8 and 9, to which is secured in any convenient manner collar 10 for the purpose of lifting the valve. The end of the valve designated at 8 is closed by gravity and spring 11 which is controlled by yoke 19. In this position the water will flow through the openings 12 in head 4 and fill the supply chamber, which is formed by shell 1 and heads 3 and 4. From the latter chamber the water will pass through the holes 6 and fill the drinking trough, which is formed above the head 3 between shell 1 and flange 5. When the water reaches the top of holes 6 it will cease to flow, until lowered in the trough.

It is obvious from the foregoing description that the storage chamber may be filled at will, and as long as there is water in the storage chamber the trough will be automatically filled to the top of holes 6.

The stem portion 7 and head portions 8 and 9 of the valve are formed in one piece to obviate the trouble heretofore experienced by hinged valves and linked connections. Hinged valves by constant opening and closing wear out of alinement and leak, thus rendering them useless. The valve head portions 8 and 9 being rigid with the stem portion 7 are always in alinement and never fail to seat regardless of wear. Hinged valves wear the hinge and become detached from the body of the tank, rendering them inoperative, while valve head portions rigid with the stem portion 7, as 8 and 9 have nothing to be detached from. The head portions 8 and 9 being in part with stem portion 7, linked connections are dispensed with, and the trouble formerly experienced by links and hinges wearing and becoming detached is obviated.

When the storage chamber located between heads 2 and 4 is to be filled, the water is placed in the reservoir above head 2, and the valve 7, 8, 9 is lifted by raising collar 10 until the head portions are open at 8 and closed at 9, in this position the water will flow through holes 13 and fill the storage chamber. When the storage chamber is filled the collar 10 is released and the valve will close at 8 and open at 9, owing to gravity and the force of spring 11, and in this position the water will automatically fill the watering trough to the top of holes 6 until the storage chamber is emptied, when it can again be filled.

The advantages of the reservoir and valve 7, 8, 9 lie in the ease with which large heavy tanks may be filled without moving the tank, and no equipment or funnel is required for the filling.

The burner 14 is located below the head 3 and is connected through pipe 15 to fuel tank 16, the burner being controlled by valve 17. The tank 16 is placed above the burner 14 and preferably within the reservoir, under the protection of lid 18. The pipe 15 by preference passes through heads 2, 3 and 4 and is contained within the shell 1, for the purpose of protecting it from the live stock. Large heavy tanks are usually annoying in cold weather, owing to the tendency of the contents to freeze and they are of no value when frozen, the burner is provided to prevent freezing, and a slow fire will render the drinking tank useful when it would otherwise be useless.

The watering tank is of chief importance for the watering of live stock, but may be advantageously employed for other purposes.

It is obvious that numerous changes in the details set forth may be made without departure from the essentials of the invention.

Having described my invention, what I claim as new and desire to secure by Letters Patent, is:—

1. In a stock watering tank the combination with a vertical round shell containing a reservoir a storage chamber below said reservoir and a supply chamber below said storage chamber of a watering trough surrounding said shell, a hole or holes in the side of said shell communicating from said supply chamber of said watering trough, holes communicating from said reservoir to said supply chamber, holes communicating from said storage chamber to said supply chamber, and a vertically operative valve normally closing communication between said reservoir and said storage chamber allowing free communication between said storage chamber and said reservoir, said valve closing communication between said storage chamber and said supply chamber and establishing communication between said reservoir and said storage chamber when vertically lifted.

2. In a stock watering tank the combination of a round vertical shell containing a reservoir a storage chamber and a supply chamber, a watering trough surrounding said shell, holes communicating from said reservoir to said storage chamber, holes communicating from said storage chamber to said supply chamber, holes communicating from said supply chamber to said watering trough, and a vertically operative valve normally closing the holes between said reservoir and said storage chamber said valve when vertically lifted opening the holes between said reservoir and said storage chamber and closing the holes between said storage chamber and said supply chamber.

In testimony whereof I affix my signature in the presence of two witnesses.

THOMAS BURNACE WELLER.

Witnesses:
BENJAMIN ARTHUR MCFARLAND,
ASA RICHARD CONNOR.

---

Copies of this patent may be obtained for five cents each, by addressing the "Commissioner of Patents, Washington, D. C."